US007847683B2

(12) United States Patent
Boettcher et al.

(10) Patent No.: US 7,847,683 B2
(45) Date of Patent: Dec. 7, 2010

(54) EMERGENCY MACHINE OFF FEATURE WITH SAFETY CONTROL INTERFACE

(75) Inventors: Gregory S. Boettcher, Hopewell Junction, NY (US); William R. Copeland, Poughkeepsie, NY (US); Joseph P. DeGeorge, Wappingers Falls, NY (US); Scott M. Hargash, Kingston, NY (US); William T. Petry, Wappingers Falls, NY (US); Robert R. Young, Poestenkill, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/854,035

(22) Filed: Sep. 12, 2007

(65) Prior Publication Data

US 2009/0066502 A1 Mar. 12, 2009

(51) Int. Cl.

| | |
|---|---|
| ***G08B 1/00*** | (2006.01) |
| ***G08B 29/00*** | (2006.01) |
| ***G08B 21/00*** | (2006.01) |
| ***H01H 47/00*** | (2006.01) |
| ***H05B 3/02*** | (2006.01) |

(52) U.S. Cl. ....................... 340/532; 340/635; 340/506; 307/125; 307/139; 219/507; 219/509

(58) Field of Classification Search ....................... None
See application file for complete search history.

(56) References Cited

U.S. PATENT DOCUMENTS

| | | | | |
|---|---|---|---|---|
| 4,747,041 | A | 5/1988 | Engel et al. | |
| 5,406,261 | A | 4/1995 | Glenn | |
| 6,157,096 | A * | 12/2000 | Vinciguerra | 307/125 |
| 6,178,410 | B1 | 1/2001 | Kunde et al. | |
| 6,304,005 | B1 * | 10/2001 | Aoki et al. | 307/64 |
| 6,783,080 | B2 * | 8/2004 | Antoniou et al. | 236/78 D |
| 6,853,292 | B1 | 2/2005 | Kramer et al. | |
| 2001/0023377 | A1 * | 9/2001 | Wehrung et al. | 700/230 |
| 2003/0131885 | A1 * | 7/2003 | Birtcher et al. | 137/240 |
| 2004/0035851 | A1 * | 2/2004 | Antoniou et al. | 219/509 |
| 2004/0111339 | A1 * | 6/2004 | Wehrung et al. | 705/30 |
| 2004/0250108 | A1 * | 12/2004 | Parsons et al. | 713/200 |
| 2005/0229970 | A1 * | 10/2005 | Birtcher et al. | 137/240 |
| 2007/0055409 | A1 * | 3/2007 | Rasmussen et al. | 700/286 |
| 2007/0090940 | A1 | 4/2007 | Roark et al. | |
| 2008/0030318 | A1 * | 2/2008 | Roark et al. | 340/506 |

* cited by examiner

*Primary Examiner*—Julie Lieu
(74) *Attorney, Agent, or Firm*—Cantor Colburn LLP; Joseph Petrokaitis

(57) ABSTRACT

An apparatus for implementing an emergency machine off circuit of a fabrication system, includes: at least one safety switch adapted for shunting an operation enable signal from a piece of equipment selected for removal from service, the switch also removing from service supplemental devices for the selected equipment. A semiconductor fabrication system and a method for removing equipment from service are provided.

1 Claim, 6 Drawing Sheets

Control Device Toxic Gas Equipment A - 3 (ON)
Control Device Toxic Gas Equipment A - 3 (ON)
Control Device Toxic Gas Equipment A - 3 (OFF)
Equipment C - 8
Equipment B - 8
Equipment A - 8
EMO - 1
20
20
20
60
40

Toxic Gas Equipment A
Toxic Gas Equipment B
Toxic Gas Equipment B
6
Control Device
4
Electrical Box
2
1
Chiller
9
10
Heat Exchanger
7
Equipment C
Equipment B
Equipment A
8
--PRIOR ART--

EMERGENCY MACHINE OFF FEATURE WITH SAFETY CONTROL INTERFACE

BACKGROUND OF THE INVENTION

1. Field of the Invention

The present disclosure relates generally to electrical circuits for system safety controls and, in particular, to emergency machine off system disabling circuits.

2. Description of the Related Art

A variety of equipment systems are utilized within the semiconductor fabrication industry, which include peripherals and ancillary components. From time to time, equipment systems require power down to facilitate safe service. A complicating factor arises when components and/or sub assemblies fail and/or require emergency service; thereby, impacting the entire system.

Industry safety standards require the use of an "emergency off circuit" (EMO) during any unplanned shutdowns and/or repairs activities. Activation of the EMO causes the entire system to halt/shutdown/power off. Therefore, some service personnel may attempt to override the EMO safety circuit to facilitate continued equipment operation during service procedures, fostering creating an unsafe condition. Various unsafe techniques are used. For example, service personnel can "jumper out" the systems EMO circuit rendering it inoperative, increasing the risk of employee injury during the service activity. Unfortunately, this technique does not control or protect personnel from all remaining hazardous energy sources within the system. Continuing operation in this manner may lead to significant personal injury, when for example, when toxic gas is delivered to a component that is not operational or involved with the primary maintenance activity.

What is needed are apparatus providing a safety control circuit design, such as the controls provided herein. When implemented, the apparatus provide safe controls for de-energizing/isolating selected equipment system components and sub-components, while other parts of the system remain active while ensuring all safety controls circuits remain fully functional for all aspects of the equipment system still in use.

BRIEF SUMMARY OF THE INVENTION

In an embodiment, an apparatus for implementing an emergency machine off (EMO) circuit of a fabrication system, is provided and includes: at least one safety switch adapted for shunting an operation enable signal from a piece of equipment selected for removal from service, the switch also removing from service supplemental devices for the selected equipment.

In another embodiment, a semiconductor fabrication system is provided and includes: an emergency machine off (EMO) circuit including an EMO loop for providing an operation enable to a plurality of pieces of equipment of the fabrication system, the loop including at least one safety switch adapted for shunting an operation enable signal from a piece of equipment selected for removal from service, the switch also removing from service supplemental devices for the selected equipment.

In a further embodiment, a method for removing equipment in a fabrication system from service, is provided and includes: selecting equipment for removal from service; shunting an operation enable signal from the selected equipment and removing supplemental devices associated with the selected equipment from service.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
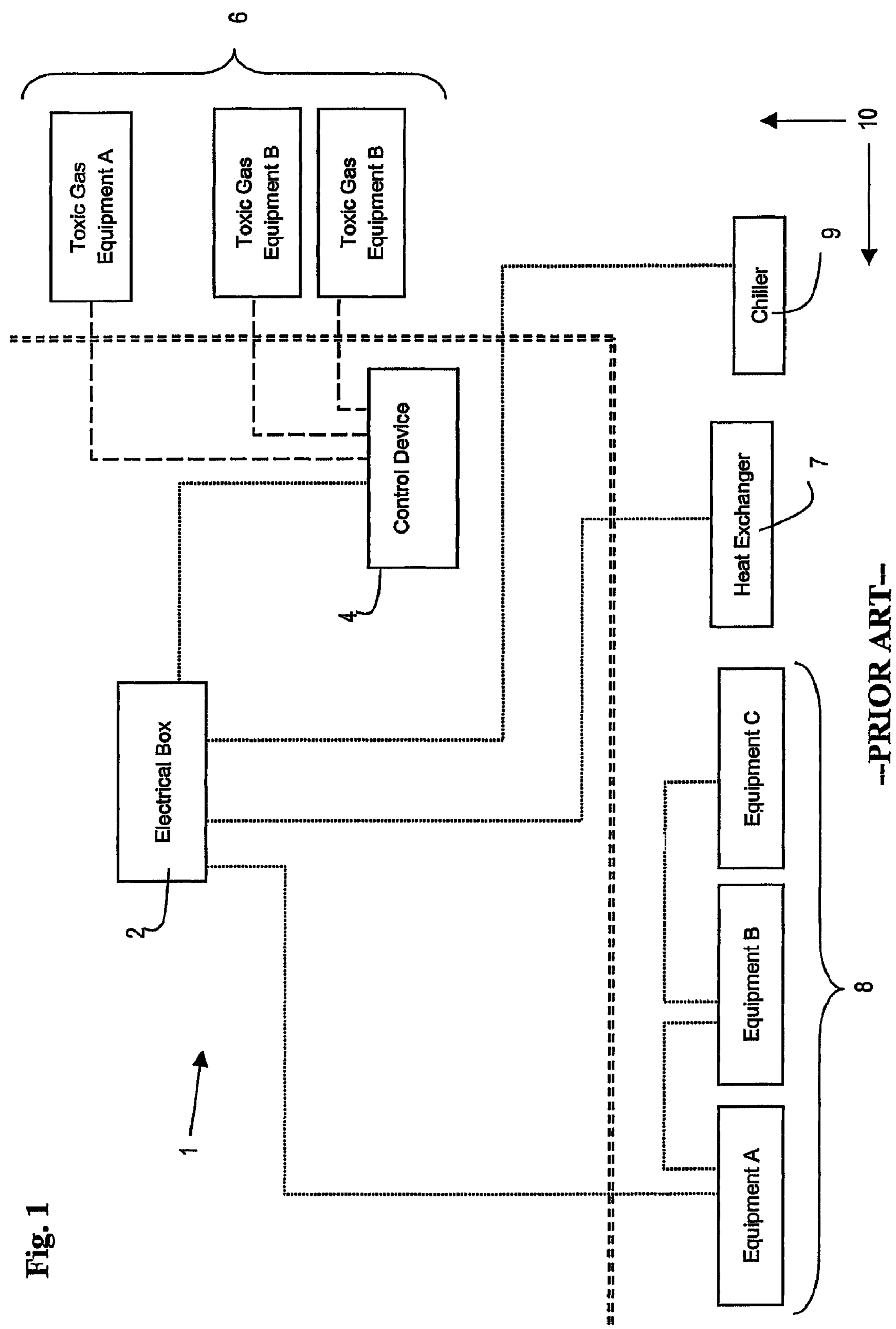
FIG. 1 depicts aspects of a prior art "emergency machine off" circuit for a fabrication system.

The detailed description explains the preferred embodiments of the invention, together with advantages and features, by way of example with reference to the drawings.

DETAILED DESCRIPTION OF THE INVENTION

Disclosed are techniques for providing improved safety controls to a fabrication system. The controls may be used in conjunction with existing controls, such as an "Emergency Machine Off" (EMO) system. The controls may be used advantageously with other existing control systems, and are not limited to use in semiconductor fabrication systems.

As disclosed herein, the safety controls are discussed with relation to an embodiment of a semiconductor fabrication system. It is recognized that many embodiments of fabrication systems are known and may make use of the teachings herein. Further, other systems, such as power generation, flow controls, process controls, large scale manufacturing and other such systems may make use of the teachings herein. Accordingly, the ensuing discussion regarding semiconductor fabrication is not limiting of the invention and is merely illustrative.

First, some definitions and useful terms are provided. The term "equipment" generally makes reference to a part of a fabrication system. Most often, as discussed herein, the term "equipment" refers to a portion of the fabrication system (e.g., one or more components) that is not operating as desired, and therefore initiates or is cause to initiate, actuation of an "emergency machine off" function. The term "supplemental device" makes reference to devices associated with or in support of selected equipment.

In an exemplary embodiment, the "fabrication system" is a chemical vapor deposition (CVD) system. Many embodiments of CVD systems are known. These include, without limitation, systems classified by operating pressure, such as: atmospheric pressure CVD (APCVD); low-pressure CVD (LPCVD); ultrahigh vacuum CVD (UHVCVD). Other systems include: aerosol assisted CVD (AACVD); direct liquid injection CVD (DLICVD); plasma methods (PCVD); microwave plasma-assisted CVD (MPCVD); plasma-enhanced CVD (PECVD); remote plasma-enhanced CVD (RPECVD); atomic layer CVD (ALCVD); hot wire CVD (HWCVD) (also known as "catalytic CVD" (Cat-CVD) or "hot filament CVD" (HFCVD); metalorganic chemical vapor deposition (MOCVD); rapid thermal CVD (RTCVD); vapor phase epitaxy (VPE) and others. Aside from CVD, the fabrication system may include systems implementing processes for any one of deposition, removal, patterning, and modification of electrical properties, as well as other processes and techniques. As used herein, "Emergency Machine Off" (EMO) circuit makes reference to a circuit that provides for shutdown of the fabrication system. The EMO is generally a control circuit that, when deactivated, places the fabrication system into a complete shutdown. An "EMO Loop" generally includes a loop providing at least one of a power signal and a set of machine executable instructions (i.e., some form of an operation enable signal) to pieces of equipment coupled to the EMO circuit.

As used herein, the term "circuit" generally makes reference to hardwired circuits, in particular this is the case with the prior art. However, it is recognized that aspects of control systems may be implemented in software. Accordingly, circuits implementing the control systems related to the teachings herein may be implemented in software or hardware and in various combinations as appropriate. Thus, the drawings provided herein may be considered descriptive of logic as well as actual wiring and/or other components. In that regard, the operation enable signal generally provides at least one of a power signal and a set of machine executable instructions. Such instructions may be interpreted by processing and other features of equipment coupled to the circuit.

As discussed above, in the prior art, all components of a fabrication system are typically powered off when equipment within the EMO loop must be replaced or serviced. Referring now to FIG. 1, there are shown aspects of a current design for an EMO function.

In FIG. 1, a prior art Emergency Machine Off (EMO) circuit 1 includes an electrical box 2, a control device 4, a plurality of supplemental devices 6 (shown here as supplies of toxic gas that correlate to certain system equipment), a plurality of equipment 8 which are generally part of the fabrication system 10, a heat exchanger 7 and a chiller 9 (both of which are included in the fabrication system 10). As depicted in FIG. 1, certain aspects are linked by at least one EMO wire, depicted by single dotted lines. Other aspects are linked by at least one control device wire, depicted by single dashed lines.

As shown in FIG. 1, the plurality of equipment 8 may include various components, including, for example, a pump, a power supply, a pressure supply, a vacuum supply, a spray system, a vaporizing system, a deposition system, a plasma generator, a lamp, a laser, a lithography system and the like. Accordingly, the plurality of supplemental devices 6 include devices such as supplies of materials (including liquid, vapor, and other forms), delivery systems for the supplies, power supplies and other such items as used in a fabrication system 10. As depicted in FIG. 1, certain ones of the supplemental devices 6 may correlate with certain ones of the equipment 8.

It should be recognized that the EMO typically places the equipment into a safe shutdown condition and will restrict all hazardous potentials to a main power enclosure, such as the electrical box 2. Accordingly, all hazardous voltage is removed from the equipment 8, flow of hazardous production materials is stopped, radiation sources are de-energized or contained, capacitors are grounded, all moving parts are stopped, internal and external heat sources are shut off, and the fabrication system 10 as a whole presents minimum hazard to personnel or the facility. Accordingly, and for example, a fault with equipment A will initiate shutdown of the entire fabrication system 10. Accordingly, an improved EMO 1 that includes a safety control interface for removing portions of the fabrication system 10 from service is provided herein.

Figure 2:
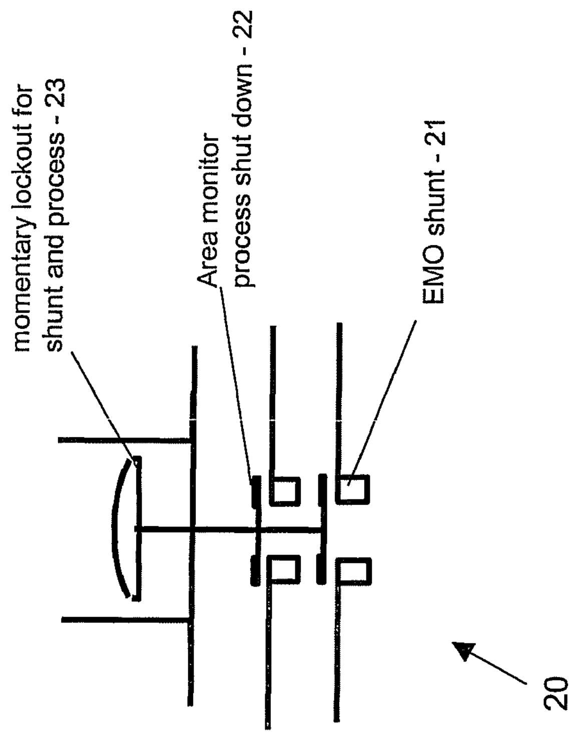
FIG. 2 depicts an exemplary safety switch.

Now with reference to FIG. 2, aspects of an embodiment of a safety switch 20 are depicted. The safety switch 20 includes a design for providing a momentary lockout for shunt and process control. The design is equipped with double-pole, double-throw switching. In this example, an area monitor process shutdown 22 is included. The safety switch 20 includes an EMO shunt 21 for shunting process signals. In another aspect, FIG. 3 depicts a side view of the safety switch 20.

Figure 3:
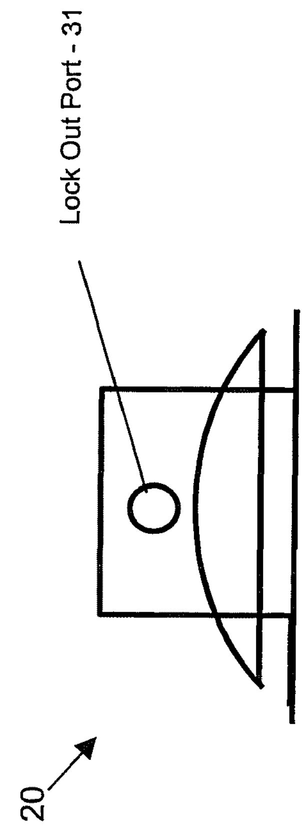
FIG. 3 depicts a side view of the safety switch of FIG. 2.

In the embodiment depicted in FIG. 3, the safety switch 20 includes a lockout port 31. The lockout port 31 provides for manual lockout of an associated equipment 8. The lockout may be lifted manually by personnel when restoration to service of the respective equipment 8 is desired.

One skilled in the art will recognize that the double-pole, double-throw switching design is merely one embodiment of a safety switch 20, and that other embodiments may be used. For example, other designs of EMO circuits 1 may make use of switches including at least one of a single-pole, single-throw; a single-pole, double-throw; a single-pole changeover; a single-pole, centre off, a double-pole, single-throw; a double-pole changeover; and a double-pole, centre off switch as the safety switch 20 (as well as other switch designs).

Figure 4:
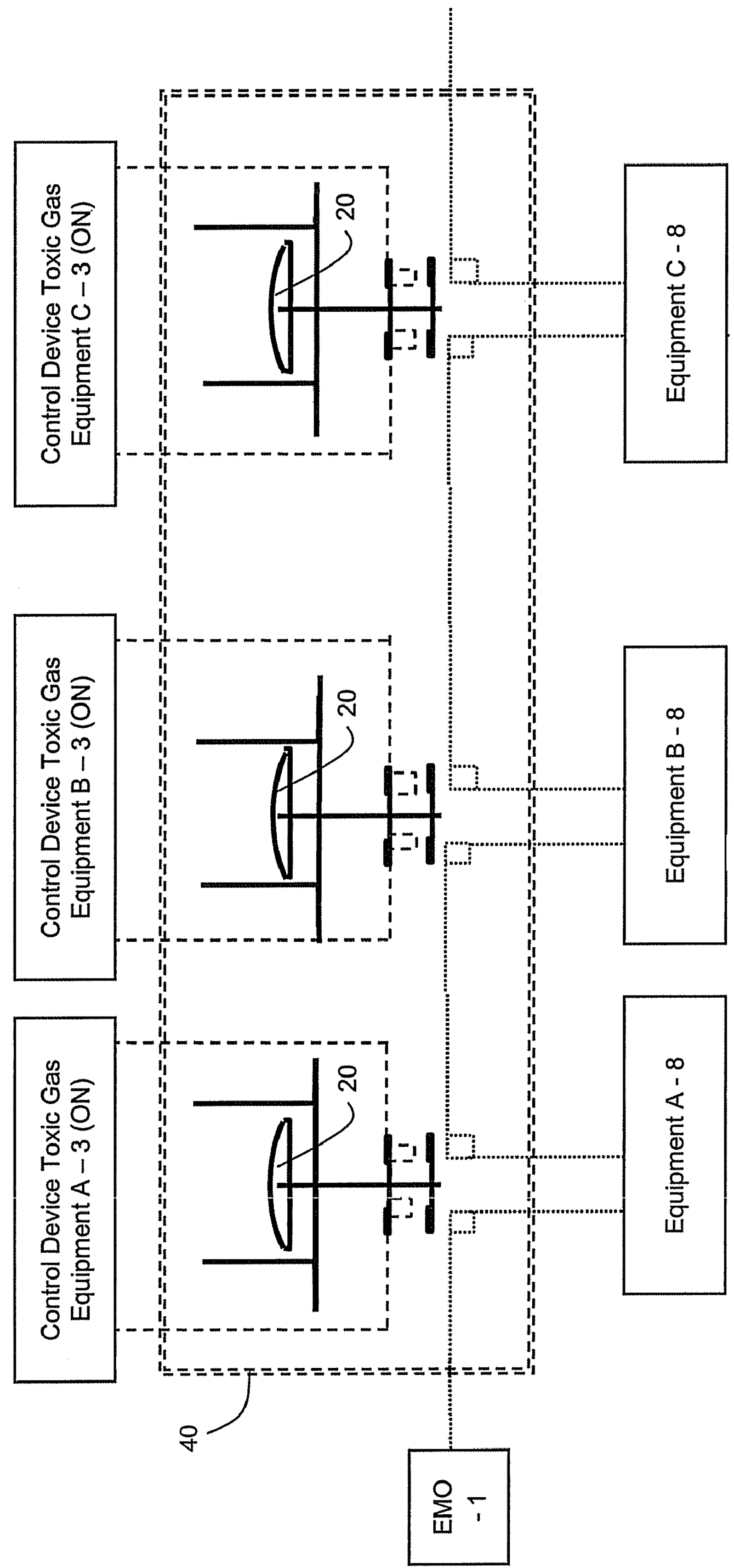
FIG. 4 depicts a multiple safety switch in an operational condition.

In FIG. 4, aspects of a multiple safety switch 40 are provided. In this exemplary embodiment, operation of a control device 3 and associated supply of toxic gas is controlled by a plurality of the safety switches 20. Each control device 3 is associated with a respective piece of equipment 8. As depicted in FIG. 4, each of the pieces of equipment 8 (i.e., equipment A, B and C) are operational, and the associated control devices 3 permit delivery of toxic gas (i.e., are in an "ON" state). This may be better understood with reference to FIG. 5.

Figure 5:
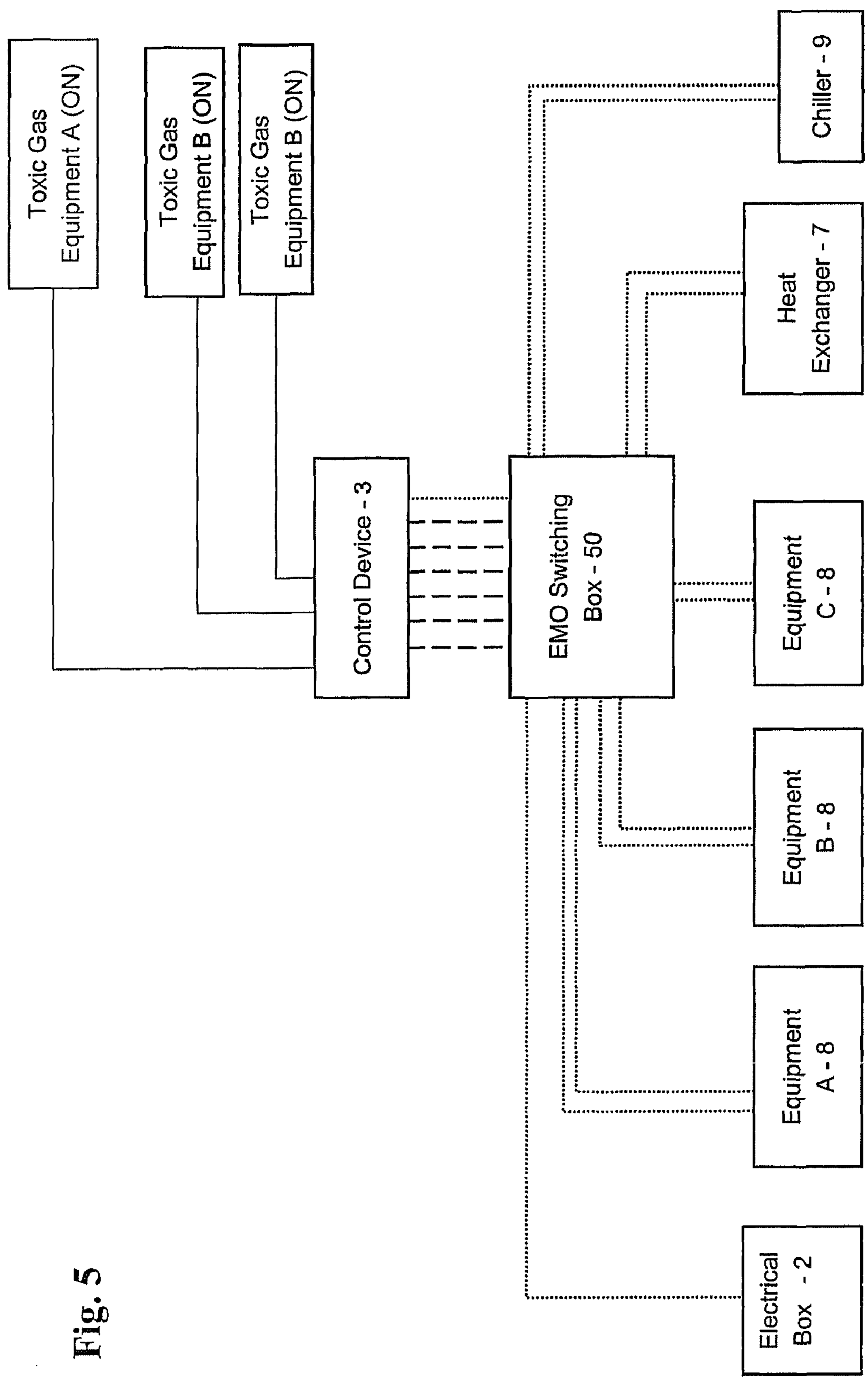
FIG. 5 depicts a functional diagram for the switch arrangement of FIG. 4.

In FIG. 5, an EMO switching box 50 is shown. In this embodiment, the EMO switching box 50 includes a plurality of safety switches 20. Some of the safety switches 20 may be included within the multiple safety switch 40. For example, single safety switches 20 may be associated with the heat exchanger 7 and the chiller 9, while the equipment 8 (A, B and C) are controlled by the multiple safety switch 40. Various components may be coupled to the safety switches 20, 40 (as indicated by the single dotted lines), and may be coupled to the control device 3 as indicated by the single dashed lines.

Figure 6:
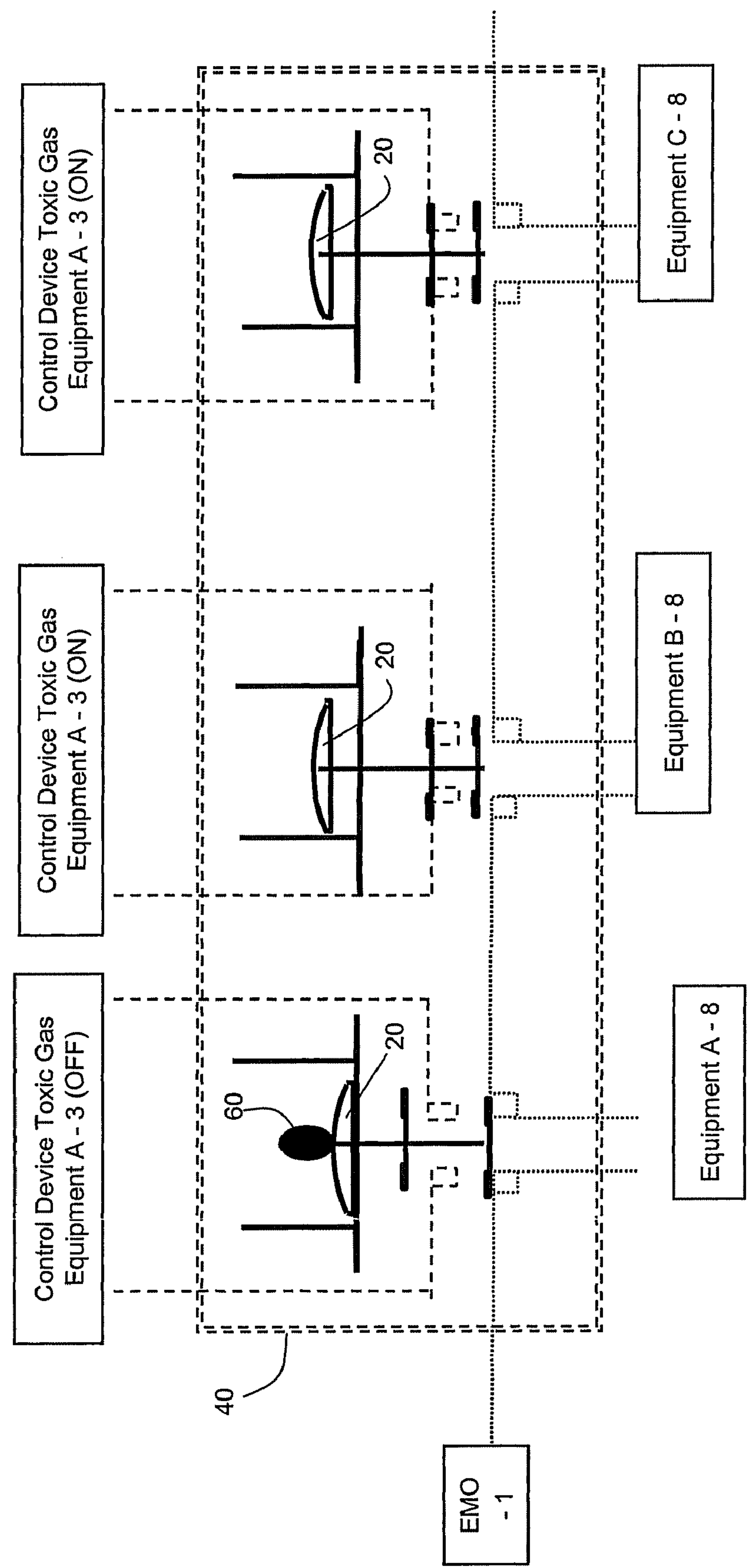
FIG. 6 depicts the multiple safety switch of FIG. 4, with one piece of equipment removed from service.
Figure 7:
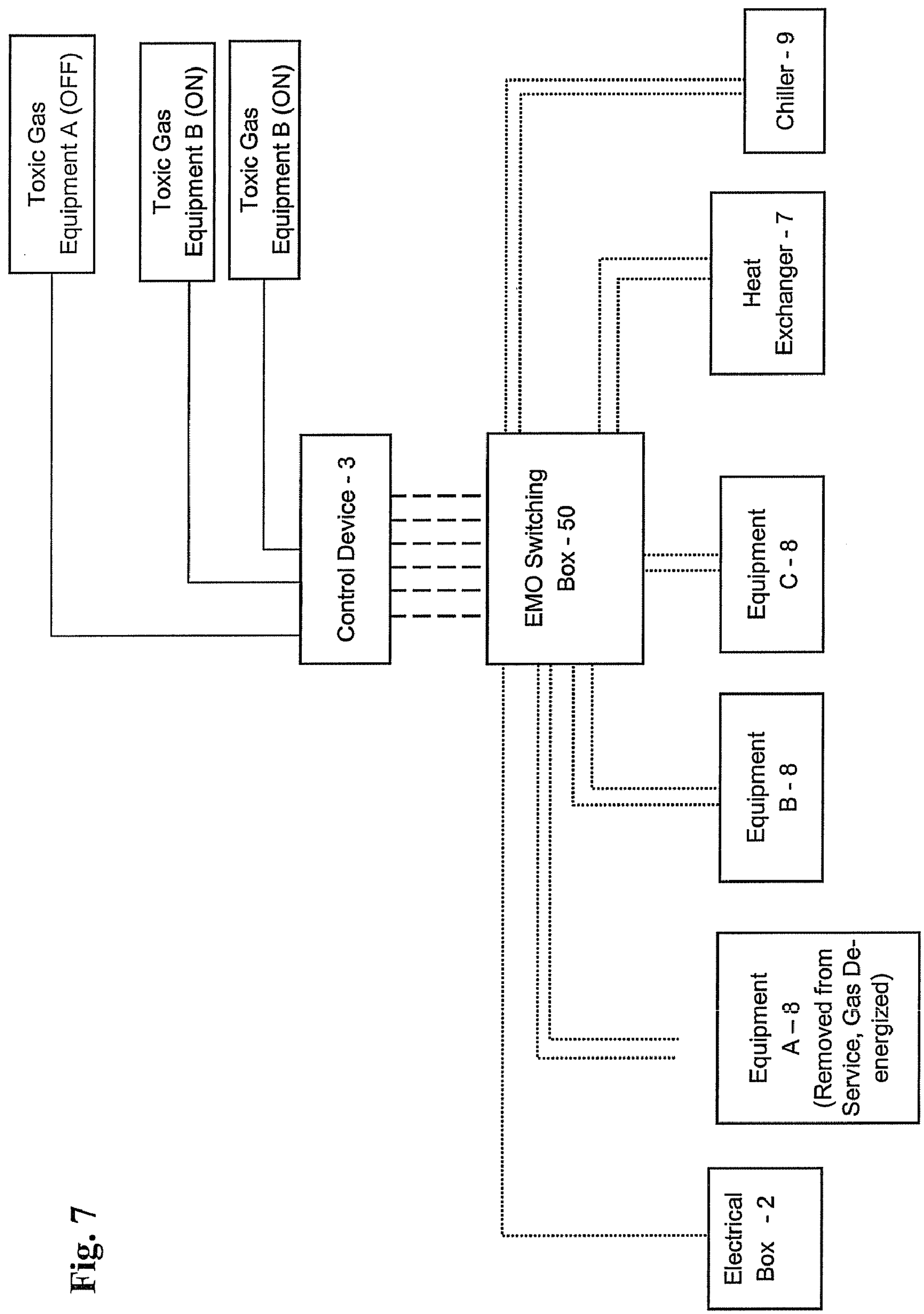
FIG. 7 depicts a functional diagram for the switch arrangement of FIG. 6.

Now with reference to FIG. 6, aspects of operation of the multiple safety switch 40 are depicted. In FIG. 6, a first safety switch 20 (associated with equipment A) is depressed. This provides for removing equipment A from service. That is, one skilled in the art will recognize that the safety switch 20 provides a shunt on the EMO circuit, effectively disengaging equipment A (shown as detached from the EMO 1 circuit). As shown in FIG. 6, a lock 60 may be placed for locking the respective safety switch 20. In some embodiments, the lock 60 makes use of the lockout port 31 for providing the locking. A functional diagram for this embodiment is depicted in FIG. 7.

Various benefits are realized by use of EMO safety switches 20, 40. For example, unsafe workaround devices, such as a jumper, are no longer needed. When a piece of equipment is removed from service, the EMO loop continues to work on the rest of the equipment All tool hazards can be selectively and safely turned off, while maintaining functionality of the EMO 1 loop circuit. Thus, the safety switch 20, 40 provides a fail safe lockable momentary switch. Only after the lock 60 is removed can tool hazards be restored to operation.

Accordingly, an improved EMO circuit 1 is provided. The EMO circuit 1 disclosed herein includes at least one safety switch 20. The safety switch 20 may be used shunt the operation enable signal to remove selected equipment 8 from service, without deactivation of the EMO loop. The removal from service may include shutting down hazards and other supplemental devices associated with the selected equipment.

Accordingly, in one embodiment, a fabrication system 10 includes the EMO circuit 1 including at least one safety switch 20, 40. The fabrication system 10 that includes the EMO circuit 1 is generally enabled for continued operation on segments that are not removed from service. Of course, one skilled in the art will recognize that this is simplified in some respects. For example, a user may wish to terminate upstream production when downstream repairs are underway, thus avoiding a backlog. Accordingly, advanced switching and other designs may be incorporated.

As described above, embodiments can be embodied in the form of computer-implemented processes and apparatuses for practicing those processes. In some exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

In some embodiments, the safety interface is implemented in software (i.e., machine executable instructions stored on machine readable media). The implementation may include a display that provides condition on each of the safety switches 20, 40 and may include operator controls for activation of selected safety switches 20, 40. Software equivalents to the foregoing hardware may be included. For example, the lock-out port 31, the various switch designs (i.e., logic) may be implemented in software.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus for implementing an emergency machine off (EMO) circuit of a semiconductor fabrication system, the apparatus comprising:

a first safety switch comprising at least one of a double-dipole, double-throw switch, a single-pole, single-throw switch; a single-pole, double-throw switch; a single-pole changeover switch; a single-pole, centre off switch; a double-pole, single-throw switch; a double-pole changeover switch; and a double-pole, centre off switch, the first safety switch comprising a lock out port and adapted for shunting an operation enable signal comprising at least one of a power signal and a set of machine executable instructions from first equipment selected for removal from service, the first safety switch also interfacing with a control device associated with a first supplemental device such that when the first safety switch shunts the operation enable signal to the first equipment, the control device removes from service the first supplemental device;

a second safety switch comprising at least one of a double-dipole, double-throw switch, a single-pole, single-throw switch; a single-pole, double-throw switch; a single-pole changeover switch; a single-pole, centre off switch; a double-pole, single-throw switch; a double-pole changeover switch; and a double-pole, centre off switch, the second safety switch comprising a lock out port and adapted for shunting an operation enable signal comprising at least one of a power signal and a set of machine executable instructions from second equipment selected for removal from service, the second safety switch also interfacing with a control device associated with a second supplemental device such that when the second safety switch shunts the operation enable signal to the second equipment, the control device removes from service the second supplemental device, the second safety switch operating independently of the first safety switch;

wherein the semiconductor fabrication system comprises at least one of an atmospheric pressure chemical vapor deposition system; a low-pressure chemical vapor deposition system; a ultrahigh vacuum chemical vapor deposition system; an aerosol assisted chemical vapor deposition system; a direct liquid injection chemical vapor deposition system; a plasma method chemical vapor deposition system; a microwave plasma-assisted chemical vapor deposition system; a plasma-enhanced chemical vapor deposition system; a remote plasma-enhanced chemical vapor deposition system; an atomic layer chemical vapor deposition system; a hot wire chemical vapor deposition system; a metalorganic chemical vapor deposition system; a rapid thermal chemical vapor deposition system; a vapor phase epitaxy system; a system implementing a process for any one of deposition, removal, patterning, and modification of electrical properties;

wherein the first equipment and second equipment comprises at least one of a pump, a power supply, a pressure supply, a vacuum supply, a spray system, a vaporizing system, a deposition system, a plasma generator, a lamp, a laser, and a lithography system; and machine executable instructions stored on machine readable media further comprising instructions for displaying a status of the first safety switch and second safety switch and controlling a status of the first safety switch and second safety switch.

* * * * *